United States Patent [19]

Tam

[11] Patent Number: 4,978,217
[45] Date of Patent: Dec. 18, 1990

[54] LUMINOUS SCREEN PROJECTOR

[76] Inventor: Kam T. Tam, Box 3135, Santa Clara, Calif. 95055

[21] Appl. No.: 482,225

[22] Filed: Feb. 20, 1990

[51] Int. Cl.⁵ .............................................. G01B 21/28
[52] U.S. Cl. ..................................... 353/119; 353/99; 353/78; 358/238,254
[58] Field of Search ...................... 353/119, 98, 99, 77, 353/78, 74, 75; 358/231, 237, 238, 254

[56] References Cited

U.S. PATENT DOCUMENTS

| | | | |
|---|---|---|---|
| 2,287,307 | 6/1942 | Herbst | 178/5.4 |
| 3,800,085 | 3/1974 | Ambats et al. | 178/7.91 |
| 3,820,885 | 6/1974 | Miller | 353/98 |
| 3,900,253 | 8/1975 | Astero | 353/63 |
| 4,021,105 | 5/1977 | Schubach | 353/119 |
| 4,051,535 | 9/1977 | Inglis | 358/231 |
| 4,074,322 | 2/1978 | Cammilleri | 358/237 |
| 4,208,676 | 6/1980 | Berwick et al. | 358/237 |
| 4,215,373 | 7/1980 | Goldenberg et al. | 358/237 |
| 4,231,067 | 10/1980 | Jewel et al. | 358/237 |
| 4,281,353 | 7/1981 | Scarborough, Jr. | 358/254 |
| 4,293,878 | 10/1981 | Sanchez | 358/231 |

FOREIGN PATENT DOCUMENTS 1166816  4/1964  Fed. Rep. of Germany ...... 358/231
563435  11/1956  Italy ................................. 358/237

Primary Examiner—Harry N. Haroian

[57] ABSTRACT

An apparatus and method for projecting optical images from electronic devices with luminous screens such as television receivers or computer terminal displays includes an image inversion means and a reflective projection means. The image inversion means comprises an assembly of two normally intersecting plane mirrors disposed close by the luminous screen. Object images from the luminous screen enter into one of the mirrors of the image inversion means as an upright and nonreversed image and are reflected by the other plane mirror out of the image inversion means as an inverted and nonreversed image. The reflective projection means comprises a parabolic concave mirror, positioned close by the image inversion means, and which captures the inverted and nonreversed image and projects it into a remote viewing screen as an enlarged, upright and nonreversed real image. The apparatus and method is designed to be adaptable to luminous screens of various sizes and capable of projecting high quality images without resorting to any alterations of electronics or complicated optics.

24 Claims, 6 Drawing Sheets

LUMINOUS SCREEN PROJECTOR

BACKGROUND OF TH INVENTION

1. Field of the Invention

The present invention relates to an optical projection apparatus and method. In particular, this invention is related to image projection of luminous screens from electronic devices such as television receivers or computer display terminals.

2. Description of the Related Art

Electronic display technology has advanced rapidly in recent years. The most commonly used display technology is the Cathode Ray Tube (CRT) which is widely adopted in the television and computer terminal display industries. However, other technologies are starting to gain acceptance. Technologies such as the Light Emitting Diodes (LED), Gas Discharge Display and Liquid Crystal Display (LCD) with background light begin to show prominence. Hereinafter, the term "luminous screen" used in this specification and in the appended claims does not restrict itself to any specific display technology. However, for the purpose of a consistent and clear illustration, Cathode Ray Tubes are adopted.

Luminous screens in conventional electronic screen display can only assume a limited size. However, there seems to be an unsatisfied demand for large screen television sets. The benefits of a large screen is multi-fold. A large screen not only avails the audience with the viewing enjoyment of life-like images, it also avoids viewer fatigue from watching a small screen at a long distance for a prolonged time. Other than for regular television program viewing, with the recent proliferation of Video Cassette Recorder (VCR), movies can be enjoyed leisurely at home in an atmosphere similar to a movie-theater.

Enlargements of electronic luminous screen images are also demanded in commercial applications and in education. A product demonstration or an instructional series displayed on a large screen can certainly reach a bigger assembly of audience. Moreover, in classroom instruction, especially in the areas of computer usage or software education, projection of images from the computer display terminal facilitates communications between the instructor and a larger group of students. With the current state of the manufacturing technology, the commonly used Cathode Ray Tubes generally measure no more than approximately 40 inches on the diagonal across the visible portion of the screen. The trend indicates that this seems to be the limit. Beyond this dimension, the cost of manufacturing for building bigger screen tubes will be uneconomical. To satisfy the consumer demand for large screen television sets, giant projection type televisions are marketed by a number of manufacturers. These sets normally include three special projection tubes, each of the tubes projects an image with a primary color, and the images of the three primary colors are combined together on a remote screen. Not only are these sets expensive, they are also very bulky. There exists a need for a projecting system which performs the similar function but is more affordable.

Add-on projection apparatuses that can be adapted to operate with any regular television sets or devices with a luminous screen would be ideal and several of them were invented in the past. Prior art such as U.S. Pat. Nos. 3,900,253 to Astero, Aug. 19, 1975; 4,208,676 to Berwick et al., Jun. 17, 1980; and 4,293,878 to Sanchez, Oct. 6, 1981 all place convex lenses inside enclosures. Generally, the convex lens receives the light from the luminous screen and projects it onto a separate remote screen. Due to the relatively small aperture sizes of the lenses, considerable light energy is lost within the enclosure. Only a small percentage of light energy from the light source is actually transmitted from the luminous screen onto the remote screen. As a consequence, the projected images can only be viewed in a dark room. Moreover, a single set of lenses can only project inverted images. Various methods were used in the prior arts for image re-inverting. U.S. Pat. Nos. 4,208,676 to Berwick et al. Jun. 17, 1980; 3,800,085 to Ambats et al. Mar. 26, 1974; and 4,215,373 to Goldenberg et al. Jul. 29, 1980 depend on a modification of the vertical scan circuitry driving the luminous screen. For a television receiver to be compatible with these devices, internal circuits of the television set need to be altered. Before projection, the image of the television screen is inverted first by turning on a special add-on switch in the altered television set. Other prior art such as U.S. Pat. No. 4,293,878 to Sanchez et al., Oct. 6, 1981 involve an additional intermediate lens in between the luminous screen and the projection lens for image re-inverting. There are several drawbacks with this implementation. Further loss of light results due to the intermediate lens with its limited aperture size. A physically protruding system, which encroaches into the limited projection space is also undesirable. Thus, optical projection apparatus built with lenses of limited aperture sizes possess shortfalls. Part of the reasons for lenses that are normally restrictive in aperture sizes is because ground lenses resulted from the manufacturing process are usually spherical in surface curvature. Too large a lens aperture with a spherical surface curvature and a low f-number would incur all the undesirable optical defects such as spherical aberration, antismatism and coma. To fabricate large aperture lens with all the optical defects corrected would require expensive lens combinations built of materials of different refractive indexes. It is for this reason that apparatuses which use lenses with limited apertures as light processing elements do not utilize the light energy from the luminous screen to an efficient extent, and most of the light is lost inside the enclosure. One further disadvantage associated with prior art projectors that use lenses is that since lenses are adopted for light processing and magnification, chromatic aberration, the focusing of different colors through a lens built of a homogeneous material, is inherent even for lens with a high f-number. The result is a sharp image for one color but blurred for the other colors. To eliminate the undesirable chromatic aberration effect, again, large aperture achromatic lenses have to be used which are expensive.

The aforementioned shortfalls are avoided by projecting apparatuses using mirrors instead of lenses such as shown in U.S. Pat. No. 4,281,353 to Scarborough Jr., Jul. 28, 1981. However, they are large in physical sizes and cumbersome to operate and still do not efficiently utilize the light energy. For example, in Scarborough Jr.,s patent, the system is composed of several separate parts and is space-consuming. Considerable trial and error adjustments have to be made on the mirror stand in order to secure an image on the remote screen. Moreover, the system is applicable to luminous screens with inverted images and there is no mention of how the inverted image is achieved.

It is the object of the present invention to provide an inexpensive and highly efficient apparatus and method of projecting images from a luminous screen.

It is another object of the present invention to provide an apparatus compact in physical size without protruding into the limited projection space.

It is yet another object of the present invention to provide an apparatus which is convenient to use, is substantially maintenance free, which requires no modification of electronic circuitry associated with the luminous screen, and which requires no complicated operating procedures.

It is a further object of the present invention to provide high quality images free of chromatic aberrations and other optical defects such as spherical aberration and coma commonly associated with ordinary lenses.

It is still a further object of the present invention to provide sufficient image brightness and contrast for images to be visible in environments with reasonable ambient light.

It is still yet another object of the present invention to provide an apparatus suitable for luminous screens of different sizes, thus maximizing the convenience of usage and further minimizing manufacturing cost.

SUMMARY OF THE INVENTION

The present invention is an apparatus and method of projecting images from a luminous electronic screen onto a separate viewing medium. The present invention is designed to be an add-on instrument mountable on the frame of the luminous screen without resorting to any alterations and modifications of electronic circuitries driving the luminous screen.

Mirrors are used instead of lenses in the present invention. In this specification and in the appended claims, the word "mirror" is a generic term construed to include both first-surface and second-surface mirrors, it can also be built of any material, such as glass, plastic or metal, polished enough with a reflective surface to reflect optical images. The word "confronting" when used between mirrors means that the reflecting surfaces of the mirrors are directing onto each other allowing an unobstructive communication of light rays.

A good quality mirror can normally reflects slightly more than 90 % of the incident light rays. The same holds true for a lens built of a high-grade material which can also transmit slightly more than 90 percent of light rays. However, for the same level of manufacturing cost, mirrors can be built with relatively much larger surface areas than lenses. Illustration of optical component manufacturing is beyond the scope of the present invention. However, the following comparisons are highlighted.

To project equal quality images, in the high performance end, metallic parabolic mirrors such as built with Aluminum are much lower in cost than the corresponding lens counterpart such as an achromatic doublet of the same size. In the low performance end, any moldable plastic material with a smooth surface and a reflective coating can be used as mirrors. As for lenses, transparent plastics such as acrylic or polystyrene need to be used. Moreover, lenses with large areas require large thickness for robustness. Thick plastic lenses always pose difficulties in the fabrication process due to the fact that different sections within a lens profile of different thicknesses require different cooling cycles for solidification after the injection molding step. The resultant effect is a lens with a distorted curvature. Special technique needs to be applied which adds extra steps of manufacturing and substantially increases its costs.

With large surface areas for light processing, light rays can thus be more efficiently collected with loss reduced to a minimum. Images with good brightness and contrast would result and the projection can be viewed in an environment with high ambient light, instead of in a dark room. Another inherent advantage of using mirrors is that a foldable optical path can be materialized within the apparatus. As a consequence, a compact size projection system with an efficient use of space can be designed without encroaching into the valuable projection space. Still another advantage of utilizing mirrors is that images projected can be free of chromatic aberrations due to a fact from the basic law of Physical Optics, the angle of incident light rays onto a mirror surface always equals the angle of reflection irrespective of the wavelengths, which constitute the color content of the light rays. Thus, chromatic aberration is virtually nonexistent when color light is processed through mirrors. Such an advantage is absent in a system with lenses as the angle of refraction is different for different colors through a lens built of a homogenous material. The result is a sharp image for one color but blurred for the other colors. Moreover, the use of a parabolic concave mirror can free the projected image from other optical defects such as chromatic aberrations and coma commonly associated with lenses.

The present invention involves mirrors as light processing elements. Basically, the standard upright and nonreversed object image portrayed in a conventional television screen or a computer display monitor needs to be inverted first before projection. An image inversion means built of two plane mirrors intersecting at right angle is used to accomplish this task. The image receiving end, which is a geometrical plane inclined at 45 degrees with one of the mirrors of the image inversion means is placed in registry with the luminous screen to collect light rays. The image exit end, which is the same geometrical plane extended adjacent to the other mirror, is placed at a predetermined distance confronting a parabolic concave mirror. Light rays from the exit end of the image inversion means enter the parabolic mirror at one angle and are reflected by the parabolic mirror at another angle onto a remote screen as an enlarged, upright and nonreversed real image.

The parabolic concave mirror can also be replaced by a Fresnel concave mirror. Hereinafter, the term "Fresnel concave mirror" means a mirror which is constructed by a multiple number of concentric reflecting and finely spaced mirror rings disposed on a common planar surface and each mirror ring converges the incoming parallel light rays perpendicular to the planar surface onto a common focus in the same manner as a conventional concave mirror.

The present invention is also designed to be applicable to luminous screens of different sizes. Thus the apparatus is rendered to be more affordable by the mass production process in manufacturing.

These and other advantages, features, and objects of the present invention will be apparent from the following description in conjunction with the drawings.

DETAILED DESCRIPTION OF THE PREFERRED EMBODIMENT

Figure 1:
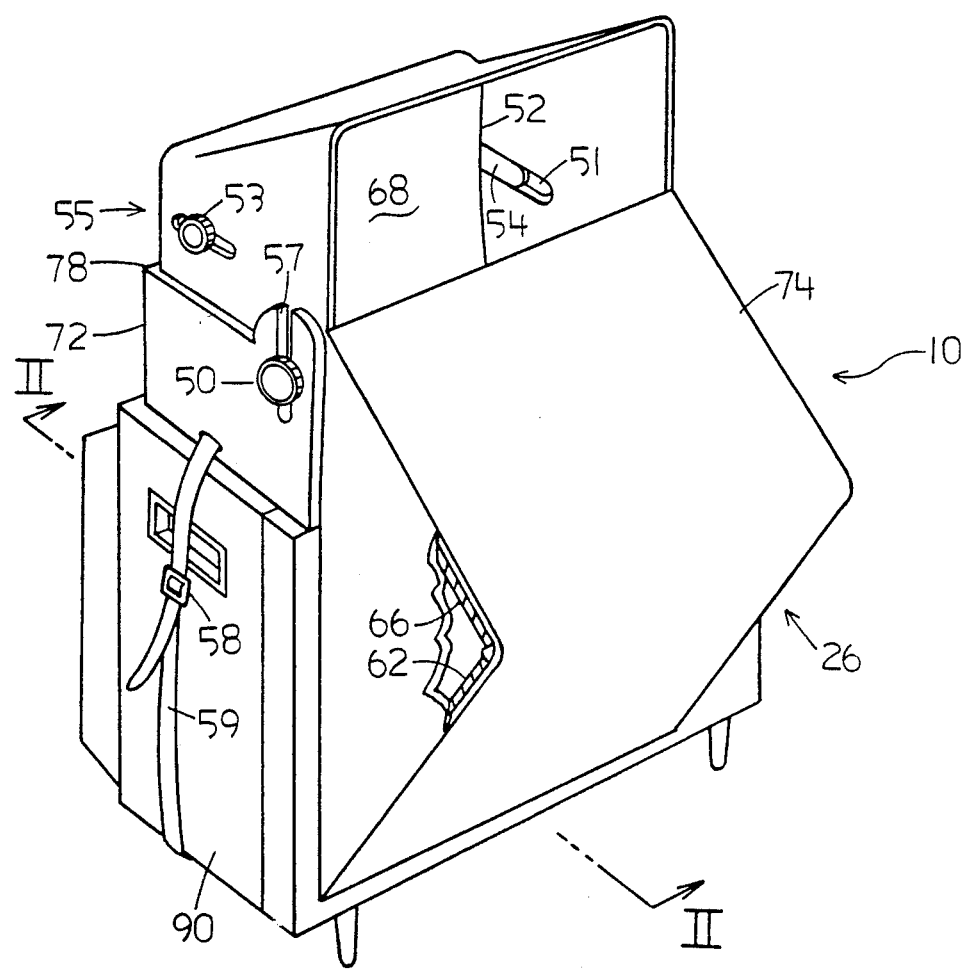
FIG. 1 is a perspective view of one embodiment of the present invention with a fixed portion removably attached to the housing carrying the luminous screen and a movable portion demountable from the fixed portion.
Figure 2:
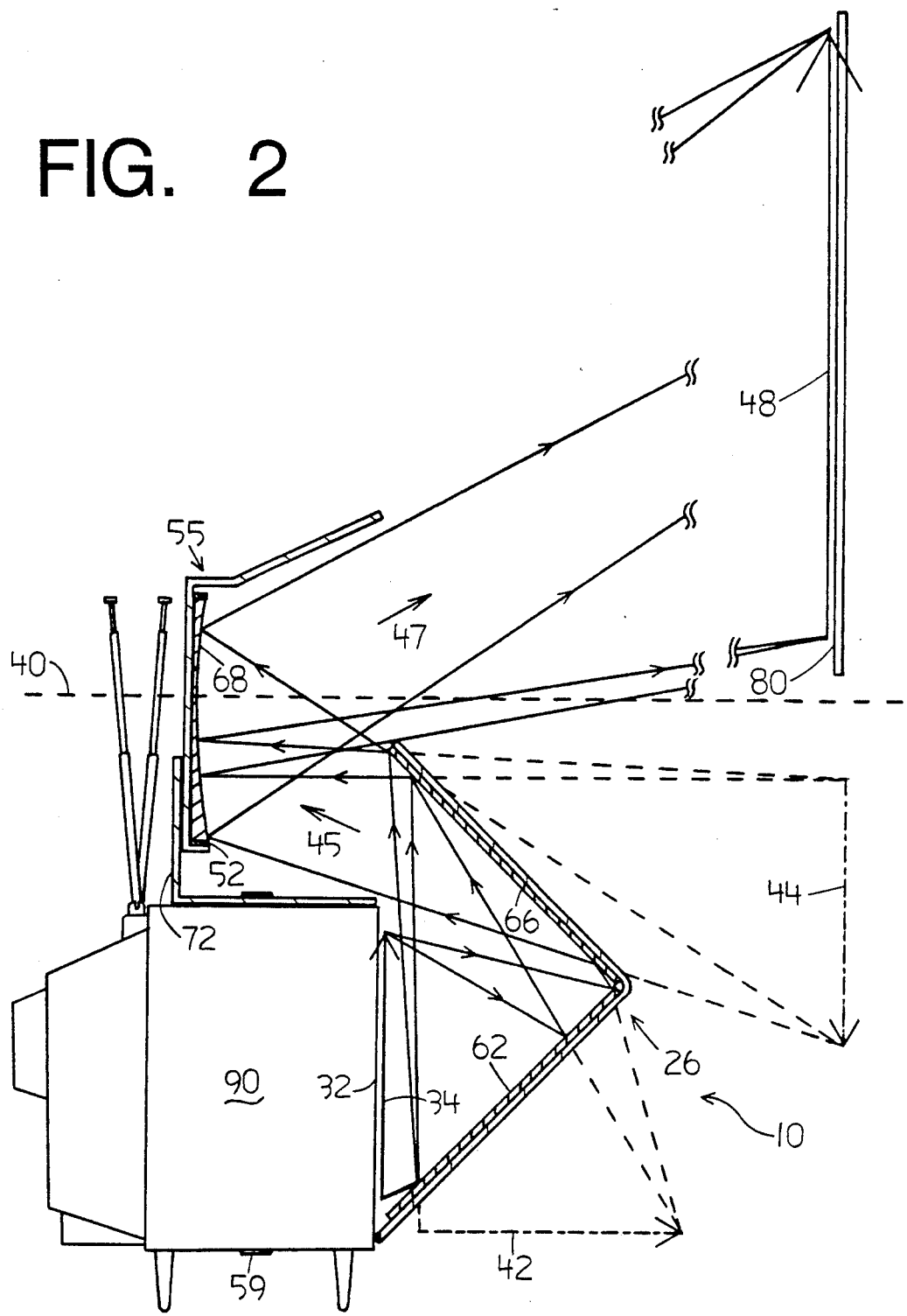
FIG. 2 is an elevational view taken along the line II—II of FIG. 1 illustrating the paths of light rays from the object image of the luminous screen to the real image on the remote screen of the present invention with an arrow sign being used as an object image and its associated reflected images.
Figure 3:
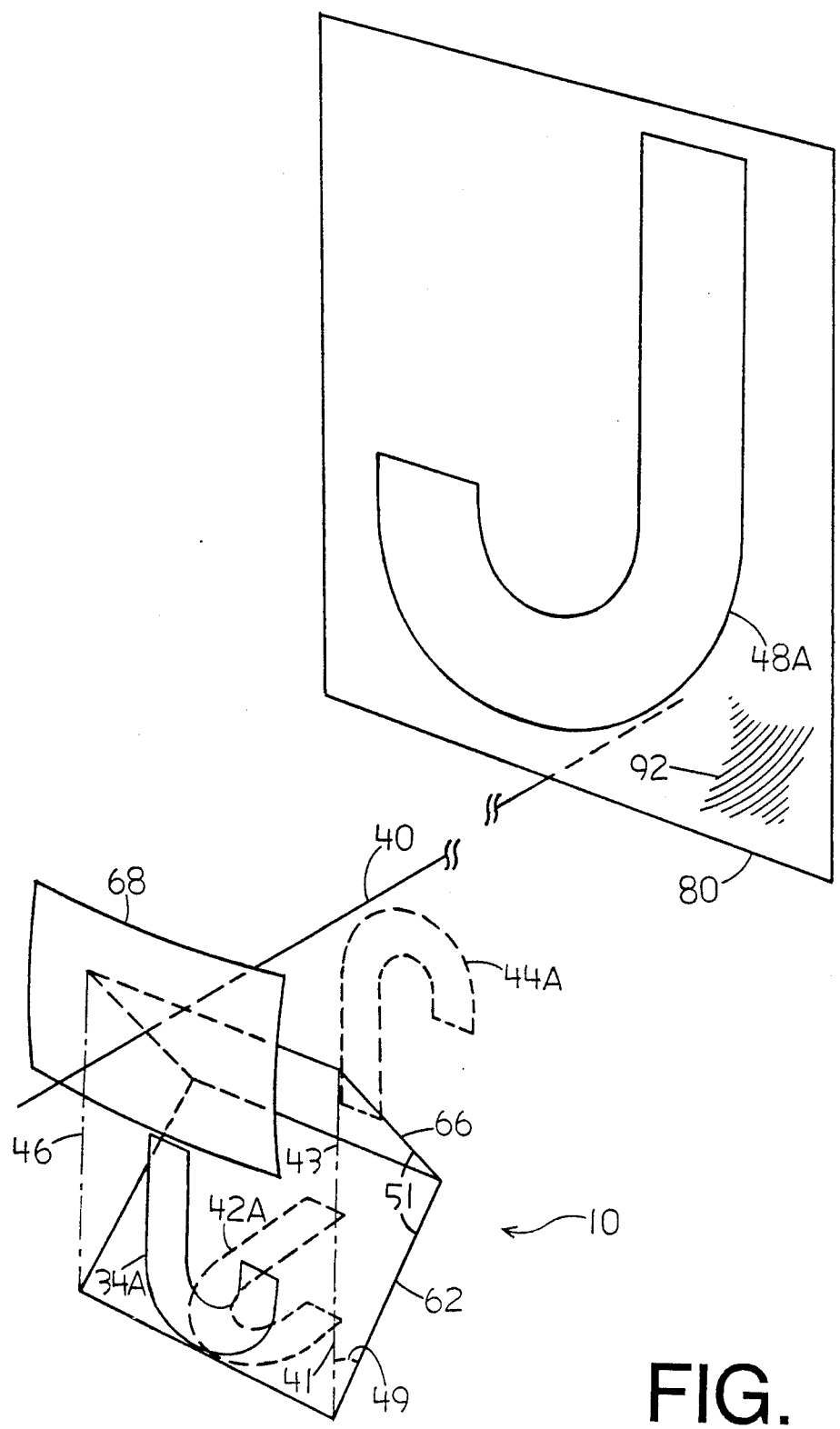
FIG. 3 shows a perspective view of the relative positions of images among mirrors and the remote screen and the orientations of the images at various stages using the uppercase alphabet "J" to represent the object image and its associated reflected images.

Referring now to FIG. 1, FIG. 2 and FIG. 3, the apparatus includes an image inversion means 26 and a reflective projection means 55.

Image inversion means 26 comprises two plane mirrors, first plane mirror 62 and second plane mirror 66. Referring to FIG. 3, the two plane mirrors are assembled together with the reflecting surfaces intersecting at an included angle 51. In the preferred embodiments, included angle 51 is 90 degrees. One edge of each of the plane mirrors intersect with each other as described while the other edges opposite to the intersecting edges lie in a geometrical plane 46. The lower portion of geometrical plane 46 adjacent to the first plane mirror 62 is defined as the image receiving end 41, while the portion of the geometrical plane 46 adjacent to the second plane mirror 66 is defined as the image exit end 43 of the image inversion means 26. The reflecting surface of first plane mirror 62 also intersects geometrical plane 46 at another included angle 49. Notice that geometrical plane 46 also approximately coincides with the plane of the luminous screen 32 (FIG. 2). In the preferred embodiments, included angle 49 is 45 degrees. The image receiving end 41 of the image inversion means 26 is positioned in registry with geometrical plane 46 for maximum screen image capturing as clearly shown in FIG. 3.

Returning now to FIG. 1 and FIG. 2, a reflective projection means 55 which comprises a mirror holder 52 and a parabolic concave mirror 68, having a focal length of approximately 22 inches is placed at a predetermined distance and disposed confrontingly with the image exit end 43 (FIG. 3) of the image inversion means 26. At a distance remote from the apparatus 10, a remote viewing medium such as opaque screen 80 is placed opposite the parabolic concave mirror 68, with the optical axis 40 of the concave parabolic mirror generally perpendicular to the remote screen 80 as shown in FIG. 3. In an environment with excessive ambient light, the image brightness on the remote viewing screen 80 can be enhanced by using a screen with a surface etched with finely spaced and directionally light-reflective grooves 92 for converging more light rays towards the preselected viewing angle. The pattern of grooves 92 can assume an aggregation of circular rings similar in construction as a Fresnel concave mirror but with a very long or a negative focal length. The interior walls of the apparatus frame 78 are also painted with a dark-color and light-absorbing coating which acts as a shielding means for intercepting stray light rays from entering onto the remote screen 80.

The electronic luminous screen 32 of television receiver 90 (FIG. 2) emits an object image 34 (shown as 34A in FIG. 3). Referring to FIG. 3, light rays from object image 34A, with an image orientation which is upright and nonreversed, falls on first plane mirror 62. A first virtual image 42A is formed. The image orientation of first virtual image 42A is upright and reversed. Light rays from first virtual image 42A travel towards the second plane mirror 66 and a second virtual image 44A is also generated. The orientation of the second virtual image 44A is inverted and nonreversed. Second virtual image 44A establishes the basis for projection. The definition of the image orientations are all clearly depicted in FIG. 2 and FIG. 3. Returning now to FIG. 2. Light rays emitting from second virtual image 44 strike the parabolic concave mirror 68 in a direction 45. In return the incoming light rays are reflected back but travel in another direction 47 towards the remote viewing screen 80, and cast a real projected image 48 onto remote screen 80, according the to following equation in Physical Optics:

$$\frac{1}{f} = \frac{1}{o} + \frac{1}{i}$$

where f is the focal length of the concave parabolic mirror 68; o is the distance between second virtual image 44 and the vertex of the parabolic mirror 68; and i is the distance between the real projected image 48 and the vertex of the parabolic concave mirror 68. Notice the orientation of the real projected image 48 (shown as 48A in FIG. 3) is enlarged, upright and nonreversed. The magnification of projection is also given by the equation:

$$m = \frac{i}{o}$$

where m is the linear magnification of the size of the real projected image 48 with respect to the size of the luminous screen object image 34, and i and o are exactly the same as previously defined.

The magnification of projection can be adjusted by changing the distance between the apparatus 10 and the remote screen 80 and modifying the distance between the parabolic mirror 68 and image inversion means 26 slidable along guide-rail means 51 in the form of grooves within the demountable frame 74 of the apparatus frame 78.

FIG. 1. shows one preferred embodiment of the present invention that is adaptable to luminous screens with various sizes of housings. For the following illustrations, the apparatus 10 is used to project images from a television receiver 90. The frame 78 comprises a fixed portion, such as frame bracket 72, and a movable portion such as demountable frame 74. Demountable frame 74 carries both the image inversion means 26 and the reflective projection means 55. Frame bracket 72 is designed to be attachable to the television receiver 90 by a fastening means. In the preferred embodiment, the fastening means is a strap 59 passing through frame bracket 72 and wrapping around the housing of television receiver 90 and secured in place by a buckle 58. Other fastening means can also be used such as a high-strength glue or screws. The demountable frame 74 is mountable onto frame bracket 72 through a coupling means with a releasable locking means. In this preferred embodiment, the coupling means with the releasable locking means includes height adjustment slots 57 (only one of which is visible) on both sides of the frame bracket 72 and secured by a pair of threaded studs attached on both sides of the demountable frame 74 and passing through slots 57 and respectively terminated by a pair of height adjustment locking knobs 50 (only one of them is visible). The preselected distance along the height adjustment slots 57 that the demountable frame 74 is secured depends on the size of the television receiver 90. The smaller the size of television receiver 90, the closer are the locking knobs 50 near the entrances of the height adjustment slots 57. After the desired position of the demountable frame 74 within the frame bracket 72 is determined, the locking knobs 50 are tightened. With the apparatus 10 mounted on the television receiver disposed at a selected distance from the remote viewing screen 80, and with the luminous screen 32 being turned on, the apparatus is ready for projection. A sharp image on the remote screen 80 can be focused by sliding the guide-pieces 54 (only one of them is visible) fixed to the parabolic mirror carrier 52 along the guide-rail means 51 (only one of them is visible) on both sides of the demountable frame 74. Once a sharp image appears on the remote screen 80, the focusing locking knobs 53 (only one of them is visible) are then tightened. To demount the apparatus from the television receiver 90, the aforementioned steps are reversed.

Figure 4:
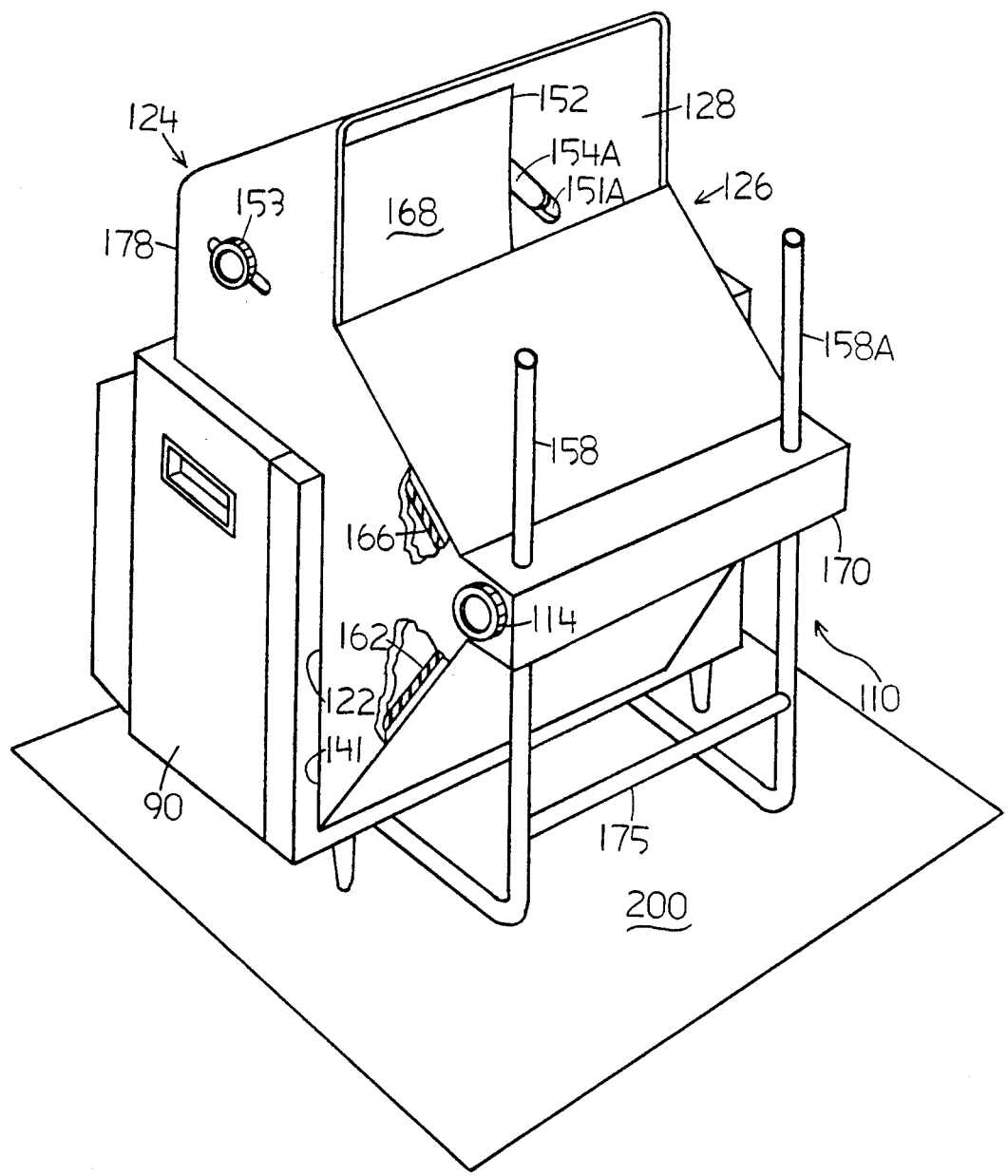
FIG. 4 is a perspective view of another embodiment of the present invention with an enclosed frame having cut-out portions for image receiving and for image projecting.

FIG. 4 shows another embodiment of the present invention with an enclosure-shape frame 178 with less movable parts suitable for a fixed size television receiver. This embodiment is extremely convenient to operate in converting television receivers from a standard viewing mode to a projection viewing mode and vice versa. All that is required is a simple pushing of the apparatus onto the luminous screen or away from the luminous screen respectively. First cut-out portion 122 is located at the image receiving end 141 of the image inversion means 126. With the image receiving end 141 of the image inversion means 126 placed adjacent the luminous screen, light rays from the luminous screen 32 can thus enter into the image inversion means 126 unobstructively. Second cut-out portion 128 is situated near the upper end of reflective projection means 124 exposes the parabolic concave mirror 168. The second cut-out portion 128 allows an unobstructive optical path existing between the parabolic concave mirror 168 and a remote screen. A protruding support section 170 is also attached to the frame 178. Elongated support member such as support poles 158 and 158A extend between the support section 170 and the supporting surface 200 that also carries the television receiver 90. Optionally, at least one joining member 175 may be included for connecting support poles 158 and 158A for fostering a firm stand for the entire apparatus 110. Support poles 158 and 158A are also tightly secured by a releasable locking mechanism such as tightening knobs 114 (only one of which is visible) once a desired altitude above the support surface 200 is selected. A sharp image on a remote screen can be focused by sliding the guide pieces 154A (only one of which is visible) fixed to the parabolic mirror carrier 152 along the guide-rail means 151A (only one of which is visible) on both the internal sidewalls of the frame 178. Once a sharp image is available on the remote screen, the focusing locking knobs 153 (only one of them is visible) are then tightened. For a normal viewing of the television screen, the apparatus 110 is simply pulled out from in front of the television receiver 90.

Figure 5A:
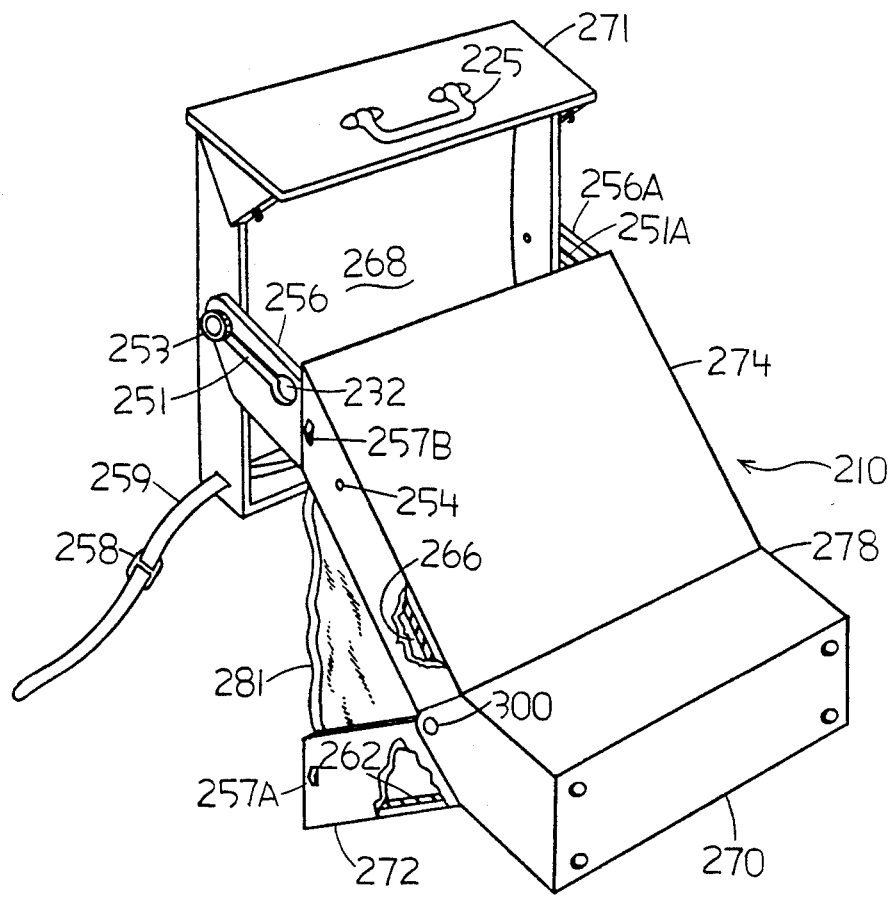
FIG. 5A is a perspective view of yet another embodiment of the present invention with a foldable feature in its operable mode position.
Figure 5B:
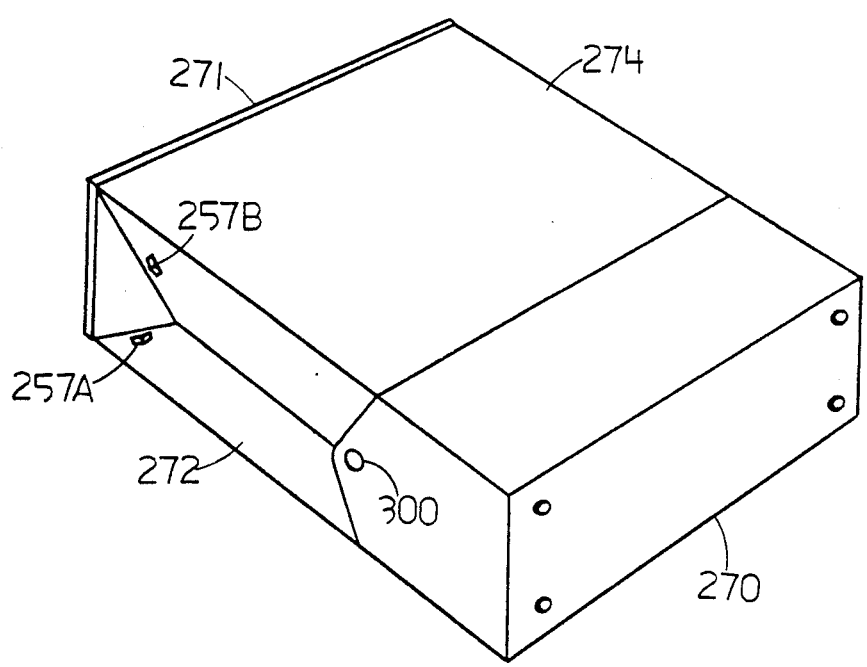
FIG. 5B is a perspective view of the embodiment depicted in FIG. 5A in its transportable mode position.

FIG. 5A and FIG. 5B show yet another embodiment of the present invention having a foldable feature characterized by a transportable mode position and an operable mode position. The interior walls of frame 278 are painted with a dark-color and light-absorbing coating for intercepting stray light rays and preventing them from reaching the remote viewing screen. The first plane mirror 262 is attached to a first movable portion 272 of the frame 278. The second plane mirror 266 is attached to a second movable portion 274 of the frame 278. The two movable portions 272 and 274 are hingedly connected together and to a base portion 270 by a hinge pin 300 as shown in FIG. 5A and FIG. 5B. At an intermediate location of the second movable portion 274, two swing-arms 256 and 256A are hingedly coupled to the sidewalls of the second movable portion 274 through hinges 254 (only one of which is visible) at one of their ends. On the other ends of the swing-arms 256 and 256A are two guide-slots 251 and 251A. A third movable portion 271, which carries the parabolic concave mirror 268, is coupled to the two swing-arms 256 and 256A through two threaded studs mounted fixedly on the sides of the third movable portion 271. Two tightening knobs 253 on the threaded studs (only one of which is visible) releasably secure the third movable portion 271 to the swing-arms. The extremities of guide slots 251 and 251A adjacent to the second movable portion 274 are formed with two circular openings 232 (only one of each is visible) with the dimension of each just large enough to loosely fit the two focus adjustment tightening knobs 253. When the apparatus 210 is in its transportable mode position, tightening knobs 253 are loosened and are slid along guide-slots 251 to openings 232. They are then rotated for movement into circular openings 232. The swing arms 256 and 256A are then rotated into the frame 278 carrying the third movable portion 271 along and settled underneath the second movable portion 274. The first movable portion 272 and the second movable portion 274 define a volume of space just large enough for the third movable portion 271 to be fitted in. The first movable portion 272 and the second movable portion 274 are then closed together with the side shielding fabrics 281 (only one of them is visible) being tucked in. All the movable portions within the apparatus frame 278 are securely locked by locking catches 257A, 257B on one side and by the corresponding catches (not shown in FIG. 5A) on the other side of the frame 278. A carrying handle 225 attached to the third movable portion 271 is also available for manually carrying the apparatus 210 in its transportable position. Reversing the aforementioned steps converts the apparatus 210 from a transportable mode position into an operable mode position.

During the operable mode position, the apparatus 210 can be secured onto the housing carrying the luminous screen by a fastening means such as a strap 259 and tightened by a buckle 258. Adjustment of the focus for a sharp image on the remote screen is possible by sliding the third movable portion 271 along guide-slots 251 and 251A and tightening at a desired position by tightening knobs 253.

Finally, other changes are possible within the scope of this invention. For example, the positions of the image inversion means and the reflective projection means can clearly be exchanged, with the reflective projection means facing the luminous screen and the image inversion means being disposed oppositely with the remote screen.

It is also clear that the apparatus can be used in a up-side-down fashion with the reflective projection means disposed below the luminous screen.

It is also obvious that the remote screen and the mirror elements can be placed together into one assembly as a compact projection system.

Furthermore, it is also apparent that the screens being used for projection do not have to be limited to the opaque and reflective type screens. Semi-transparent or translucent screen with the projection coming from behind the screen and the audience viewing the front of the screen is also practical.

While the present invention has been shown and described with reference to preferred embodiments thereof, it will be understood by those skilled in the art that these and other changes in form and detail may be made therein without departing from the scope and spirit of the invention.

I claim:

1. An apparatus for projecting an optical image from a luminous screen onto a remote viewing medium, comprising.
   a frame adapted for mounting adjacent a luminous screen;
   image inversion means disposed within said frame and having an image receiving end and an image exit end, said image receiving end being disposed adjacent the luminous screen such that an image from the luminous screen enters into said image receiving end as an upright and nonreversed image and exits as an inverted and nonreversed image from said image exit end; and
   reflective projection means movably mounted on said frame at a distance from and confronting said image exit end of said image inversion means such that said inverted and nonreversed image enters into said reflective projection means and is reflected back by said reflective projection means as an enlarged, upright and nonreversed image onto the remote viewing medium.

2. The projecting apparatus as set forth in claim 1 wherein the optical axis of said reflective projection means extends generally perpendicular to the remote viewing medium.

3. The projecting apparatus as set forth in claim 1 wherein said image inversion means comprises a mirror combination with the reflecting surface of a first plane mirror intersecting the reflecting surface of a second plane mirror at an included angle of generally 90 degrees, said first plane mirror being disposed adjacent to said luminous screen and with the reflecting surface of said first plane mirror intersecting the plane of the luminous screen at an included angle of generally 45 degrees.

4. The projecting apparatus as set forth in claim 1 wherein said reflective projection means comprises a concave mirror.

5. The projecting apparatus as set forth in claim 4 wherein said concave mirror is parabolic and has a focal length of substantially 22 inches.

6. The projecting apparatus as set forth in claim 1 wherein said reflective projection means comprises a Fresnel concave mirror having a focal length of substantially 22 inches.

7. The projecting apparatus as set forth in claim 1 wherein said frame further comprises shielding means having an interior covering with a light-absorbing coating for intercepting stray light rays from the luminous screen and preventing them from entering onto the remote viewing medium.

8. The projecting apparatus as set forth in claim 1 wherein the remote viewing medium is a reflective opaque screen having a multiplicity of finely spaced directionally light-reflective grooves enabling said enlarged, upright and nonreversed image on said reflective opaque screen to be visible in an environment with excessive ambient light.

9. The projecting apparatus as set forth in claim 1 wherein said frame comprises:
   a fixed portion having fastening means adapted for attaching said fixed portion to said luminous screen;
   a movable portion demountable from said fixed portion; and
   coupling means slidably coupling said movable portion to said fixed portion and including releasable locking means for releasably locking said movable portion to said fixed portion at a preselected position.

10. The projecting apparatus as set forth in claim 9 wherein said fastening means comprises a strap and a buckle with said strap passing through said fixed portion and around a housing for the luminous screen and secured in place by said buckle.

11. The projecting apparatus as set forth in claim 1 wherein said frame comprises an enclosure having a first cut-out portion adjacent said image receiving end of said image inversion means enabling said image from said luminous screen to enter into said image inversion means unobstructively therethrough, and a second cut-out portion adjacent said reflective projection means enabling said enlarged, upright and nonreversed image from said reflective projection means to be projected onto a remote viewing medium unobstructively therethrough.

12. The projecting apparatus as set forth in claim 11 wherein said enclosure further comprises at least one elongated support member with one end slidably connected to said enclosure and the other end adapted for engagement with a supporting surface.

13. The projecting apparatus as set forth in claim 12 further comprising a releasable locking mechanism between said frame and said support member for lockingly supporting said frame at a preselected distance above a supporting surface.

14. An apparatus for projecting luminous screen images onto a remote viewing medium, comprising:
   a frame with fastening means adapted for attachment to a luminous screen;
   image inversion means encased within said frame and having an image receiving end and an image exit end, said image receiving end being disposed adjacent the luminous screen such that an image from the luminous screen enters into said image receiving end of said image inversion means and is reflected back by said image inversion means as an inverted and nonreversed image from the image exit end; and reflective projection means movably mounted on said frame and disposed confrontingly adjacent to and at a distance from the image exit end of said image inversion means such that said inverted and nonreversed image reflected from said image inversion means enters into said reflective projection means and is reflected back by said reflective projection means as an enlarged, upright and nonreversed image onto the remote viewing medium.

15. The projecting apparatus as set forth in claim 14 wherein the optical axis of said reflective projection means extends generally perpendicular to the remote viewing medium.

16. The projecting apparatus as set forth in claim 14 wherein said image inversion means comprises two plane mirrors having one edge of the first plane mirror disposed in close proximity and in parallel with a corresponding edge of the second plane mirror, with the reflecting surface of said first plane mirror intersecting the reflecting surface of said second plane mirror at an included angle of generally 90 degrees, the opposite edge of said first plane mirror and the corresponding edge of said second plane mirror defines a geometrical plane, with the luminous screen being disposed at said geometrical plane adjacent said first plane mirror.

17. The projecting apparatus as set forth in claim 16 wherein said frame is characterized by an operable mode position and a transportable mode position, comprising:

a first movable portion with said first plane mirror mounted fixedly thereon;

a second movable portion with said second plane mirror mounted fixedly thereon; and a third movable portion with said reflective projection means mounted fixedly thereon, wherein said first movable portion and said second movable portion are pivotally engaged together with a volume of space defined therebetween, said third movable portion being slidably hingedly connected to said second movable portion and slidably engageable into said volume of space defined by said first movable portion and said second movable portion, whereby when said first movable portion and said second movable portion are pivotally pressed together and with said third movable portion being hingedly slid into said volume of space enables said apparatus in said frame to be in said transportable mode position, and when said first movable portion and said second movable portion are extended pivotally outwardly, and with said third movable portion being hingedly slid out of said volume of space enables said apparatus in said frame to be in said operable mode position.

18. The projecting apparatus as set forth in claim 17 further comprising a base portion hingedly connected to the hinging ends of said first movable portion and said second movable portion.

19. The projecting apparatus as set forth in claim 17 wherein said frame further comprises a light-absorbing shielding fabric and a light-absorbing coating interior for intercepting stray light rays from the luminous screen and preventing them from reaching said remote viewing medium.

20. The projecting apparatus as set forth in claim 14 wherein said reflective projection means comprises a parabolic concave mirror having a focal length in the range of substantially 10 inches to 30 inches.

21. The projecting apparatus as set forth in claim 14 wherein said reflective projection means comprises a Fresnel concave mirror having a focal length in the range of substantially 10 inches to 30 inches.

22. A method of projecting an optical image onto a remote viewing medium from a luminous screen comprising the steps of:

positioning an image inversion means encased within a frame adjacent to said luminous screen, said image inversion means having an image receiving end and an image exit end with said image receiving end disposed adjacent said luminous screen whereby an upright and nonreversed image from said luminous screen enters into said image inversion means and is reflected back by said image inversion means as an inverted and nonreversed image from said image exit end; and movably disposing a reflective projection means at a distance from and confronting said image exit end of said image inversion means such that said inverted and nonreversed image enters into said reflective projection means and is reflected back by said reflective projection means as an enlarged, upright and nonreversed image onto the remote viewing medium.

23. The method of projecting an optical image onto a remote viewing medium from a luminous screen as set forth in claim 22 wherein said positioning said image inversion means adjacent to said luminous screen comprises the step of disposing a first plane mirror confrontingly adjacent to and intersecting a second plane mirror at an included angle of generally 90 degrees, and with the reflecting surface of said first plane mirror disposed oppositely to and angularly with said luminous screen at an included angle of generally 45 degrees.

24. The method of projecting an optical image onto a remote viewing medium from a luminous screen as set forth in claim 22 wherein said disposing said reflective projection means at a distance from said image inversion means further comprises the step of extending the optical axis of said reflective projection means generally perpendicular to the remote viewing medium.

* * * * *